March 15, 1932.   C. J. HODGE   1,849,800
STONE BOX
Filed Nov. 3, 1930
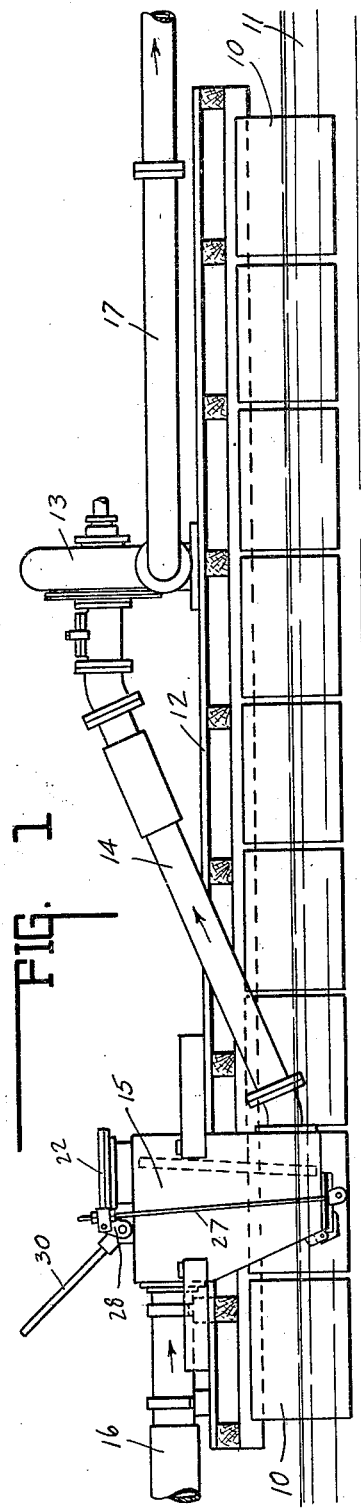
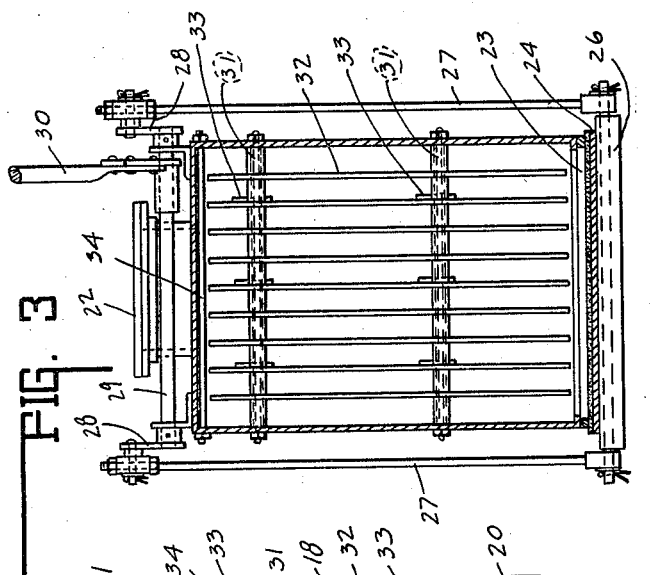
INVENTOR.
CHESTER J. HODGE
BY
Lockwood Lockwood Goldsmith & Galt
ATTORNEYS.

Patented Mar. 15, 1932

1,849,800

UNITED STATES PATENT OFFICE

CHESTER J. HODGE, OF AUBURN, INDIANA, ASSIGNOR TO HETHERINGTON & BERNER, INC., OF INDIANAPOLIS, INDIANA, A CORPORATION

STONE BOX

Application filed November 3, 1930. Serial No. 492,950.

This invention relates to a stone trap for use with dredge pumps. In the use of dredge pumps for dredging navigation channels or for the recovery of sand, gravel and other materials from the bed of a body of water, it is common practice to use in the suction line of the pump some form of trap for stopping the progress of large stones or boulders which might cause damage to the rotor of the pump. Heretofore, these traps have taken the form of a box of considerably larger cross section than the suction pipe and containing a screen for preventing the passage of large size rocks therethrough. When the trap becomes filled with trapped stones, the pump is shut down and the said stones removed by hand. The present invention has for its object the provision of a trap from which the stones may be removed without shutting down the pump and without breaking the suction or partial vacuum in the suction line.

The feature of the invention by which this object is obtained resides in the provision of a discharge opening for the said stones in the lower portion of the trap and the placing of the trap in such position that this opening is always beneath the surface of the body of water from which the material is being pumped. The said opening is preferably furnished with a door, by the opening of which the trapped stones may be periodically dumped. By placing the opening beneath the surface of the body of water, the door may be opened and the stones dumped without breaking the partial vacuum in the suction line and without interrupting the operation of the pump in any way.

Another feature of the invention resides in the form of mechanism used for operating said door. This mechanism is so arranged that it may be conveniently operated from a position above the trap.

Other objects and features of the invention will be understood from the accompanying drawings and the following description and claims:

Fig. 1 is an elevational view partly in section showing a float supporting a dredge pump, stone trap and associated pipe lines upon a body of water. Fig. 2 is a central vertical section through the stone trap. Fig. 3 is a section taken on the line 3—3 of Fig. 2.

In the drawings a plurality of air-filled, water-tight cylinders 10 float upon a body of water 11 and carry a float platform 12. A centrifugal pump 13 is mounted upon the said platform and may be driven by any suitable prime mover. The dredge pump is fitted with a suction line 14 connecting the same with a stone trap 15 which is in turn fitted with an intake pipe 16 which normally leads to the bed of the body of water and serves as a conduit for the material dredged therefrom. The pump 13 is also fitted with a discharge pipe 17 leading to a scow or to a pile of accumulated material upon the land, as desired.

The stone trap 15 consists of a water-tight casing 18 having an inlet opening 19 to be connected to the pipe 16, an outlet opening 20 to be connected to the pipe 14, an inspection opening 21 normally closed by a blank flange or cover 22, and a stone discharge opening 23. The stone discharge opening 23 is positioned at the bottom of the casing 18 and the said casing is so placed upon the float platform 12 that the opening 23 is always beneath the surface of the water 11. A door 24 is supported upon hinges 25 and serves as a closure for the opening 23. An angle iron 26 is fastened to the under side of the door 24 and has pivotally fastened to each end thereof an upwardly-extending rod 27. The rods 27 are pivotally attached at their upper ends to levers 28 attached to a shaft 29 suitably supported upon the upper surface of the casing 18. An operating lever 30 is fixedly mounted upon the said shaft. By means of this construction, the door 24 may be opened or closed by manipulation of the lever 30.

A pair of rods 31 extend horizontally from side to side of the casing 18 and are fastened to the sides of said casing. A plurality of substantially vertically-disposed bars 32 are disposed within the casing 18 and are provided with hooks 33 adapted to engage the horizontal rods 31. A horizontal rod 34 extends between the two sides of the casing 18 directly above the ends of the bars 32 and serves to maintain the said bars in position. It will be seen that the bars 32 form a screen interposed between the inlet opening 19 and the outlet opening 20 and, therefore, prevent the passage through the trap of stones of a larger size than the spacing between said bars.

In the operation of the device the door 24 is maintained in the closed position until a number of large size stones have been trapped within the casing 18. The lever 30 is then operated to open the door 24 and dump the stones without interfering in any way with the operation of the pump 13.

The invention claimed is:

1. In combination with a dredge pump adapted to pump water and other material from the bed of a body of water, a stone trap associated with the suction pipe of said pump, said trap including a casing having an inlet opening, an outlet opening and a stone discharge opening, said stone discharge opening being placed beneath the surface of said body of water and communicating therewith, a screen in said casing positioned to prevent exit of stones above a certain size through said outlet opening and positioned to provide a compartment in said casing in which stones above said size may be accumulated, and said stone discharge opening communicating with said compartment, and a closure for said stone discharge opening by the manipulation of which stones may be dropped from said compartment or retained therein, as desired.

2. In combination with a dredge pump adapted to pump water and other material from the bed of a body of water, a stone trap associated with the suction pipe of said pump, said trap including a casing having an inlet opening, an outlet opening and a stone discharge opening, said stone discharge opening being placed beneath the surface of said body of water and communicating therewith, a screen in said casing positioned to prevent exit of stones above a certain size through said outlet opening and positioned to provide a compartment in said casing in which stones above said size may be accumulated, and said stone discharge opening communicating with said compartment, a closure for said stone discharge opening by the manipulation of which stones may be dropped from said compartment or retained therein, as desired, an operating lever operable from above said trap for manipulating said closure, and an operating connection therebetween.

In witness whereof, I have hereunto affixed my signature.

CHESTER J. HODGE.